US012783423B2

(12) United States Patent
Han et al.

(10) Patent No.: US 12,783,423 B2
(45) Date of Patent: Nov. 3, 2026

(54) MEMORY CONTROLLER, SYSTEM-ON-CHIP INCLUDING THE SAME, AND OPERATING METHOD OF PROCESSOR

(71) Applicant: SAMSUNG ELECTRONICS CO., LTD., Suwon-si (KR)

(72) Inventors: Taewoo Han, Suwon-si (KR); Jinyoung Kim, Suwon-si (KR); Taehun Kim, Suwon-si (KR); Manhwee Jo, Suwon-si (KR); Minyoung Joe, Suwon-si (KR); Joonwoo Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/885,800

(22) Filed: Sep. 16, 2024

(65) Prior Publication Data

US 2025/0181514 A1 Jun. 5, 2025

(30) Foreign Application Priority Data

Dec. 1, 2023 (KR) ........................ 10 2023 0172726

(51) Int. Cl.
*G06F 12/08* (2016.01)
*G06F 12/0808* (2016.01)
*G06F 12/0895* (2016.01)
*G06F 13/16* (2006.01)

(52) U.S. Cl.
CPC ...... *G06F 12/0895* (2013.01); *G06F 12/0808* (2013.01); *G06F 13/1668* (2013.01)

(58) Field of Classification Search
CPC ............. G06F 12/0895; G06F 12/0808; G06F 13/1668; G06F 15/781; G06F 15/7807; G06F 3/0658; G06F 3/0659; G06F 15/7839
See application file for complete search history.

(56) References Cited

U.S. PATENT DOCUMENTS

| | | | | |
|---|---|---|---|---|
| 9,823,851 | B2 * | 11/2017 | Beale | G06F 3/0659 |
| 11,003,584 | B2 | 5/2021 | Cong et al. | |
| 11,055,202 | B1 | 7/2021 | Hoogerbrugge et al. | |
| 11,119,925 | B2 | 9/2021 | Biles et al. | |

(Continued)

FOREIGN PATENT DOCUMENTS

WO 2022-218517 10/2022

*Primary Examiner* — Masud K Khan
(74) *Attorney, Agent, or Firm* — Morgan, Lewis & Bockius LLP

(57) ABSTRACT

A system-on-chip includes a memory controller configured to control a memory device including a tag region and a data region and a processor configured to control a memory operation of the memory controller on the memory device. The processor is further configured to fix a start position of the tag region and a start position of the data region in the memory device, and transmit an access request and a first address indicating a memory region of the memory device to the memory controller. The memory operation on the normal data is to be performed on the memory region in one of the tag region and the data region. The memory controller is further configured to perform the memory operation on the normal data based on the first address in response to the access request.

17 Claims, 13 Drawing Sheets

(56) References Cited

U.S. PATENT DOCUMENTS

| | | | |
|---|---|---|---|
| 11,288,213 | B2 | 3/2022 | Durham et al. |
| 11,307,784 | B2 | 4/2022 | Weaver et al. |
| 11,573,907 | B2 | 2/2023 | Ayrapetyan et al. |
| 11,669,394 | B2 | 6/2023 | Chang et al. |
| 2019/0251029 | A1* | 8/2019 | Steinmacher-Burow .................... G06F 12/0817 |
| 2022/0156180 | A1 | 5/2022 | Durham et al. |

* cited by examiner

MEMORY CONTROLLER, SYSTEM-ON-CHIP INCLUDING THE SAME, AND OPERATING METHOD OF PROCESSOR

CROSS-REFERENCE TO RELATED APPLICATION

This patent application claims priority under 35 U.S.C. § 119 to Korean Patent Application No. 10-2023-0172726, filed on Dec. 1, 2023, in the Korean Intellectual Property Office, the disclosure of which is incorporated by reference in its entirety herein.

1. TECHNICAL FIELD

The inventive concept relates to a system-on-chip (SoC), and more particularly, to a memory controller that uses tag data for data security, an SoC including the same, and an operating method of a processor.

2. DISCUSSION OF RELATED ART

SoC is technology for integrating components of a complex system having multiple functions into a single semiconductor chip. With the trend towards convergence of computers, communications and broadcasting, the demand for application specific integrated circuits (ASICs) and application specific standard products (ASSPs) is shifting towards SoCs.

SoCs may require memory security to be safe from security attacks. Tag data from the processor of an SoC may be used to manage memory security. However, it is difficult to efficiently secure memory capacity when a dedicated space for the tag data is allocated in a memory device.

Therefore, a technique of efficiently securing memory capacity and enhancing memory security is desired.

SUMMARY

At least one embodiment of the inventive concept provides a system-on-chip (SoC) capable of efficiently increasing memory capacity and performing a tag operation by dynamically using a tag region of a memory device to store tag data and normal data in the tag region.

According to an embodiment of the inventive concept, there is provided an SoC including a memory controller configured to control a memory device including a tag region storing tag data and a data region storing normal data and a processor configured to control a memory operation of the memory controller on the memory device. The processor is further configured to fix a start position of the tag region and a start position of the data region in the memory device, and transmit an access request and a first address indicating a memory region of the memory device to the memory controller. The memory operation on the normal data is to be performed on the memory region in one of the tag region and the data region. The memory controller is further configured to perform the memory operation on the normal data based on the first address in response to the access request.

According to an embodiment of the inventive concept, there is provided a memory controller for controlling a memory device. The memory controller includes a logic circuit and an operation controller. The logic circuit is configured to receive, from a processor, a tag command for performing a tag operation on normal data and determine whether to perform one of the tag operation and a normal operation on the normal data based on the tag command. The operation controller is configured to receive, from the processor, a first address indicating a region on which a memory operation on the normal data is to be performed and perform the memory operation on the normal data in a memory region of the memory device corresponding to the first address in a tag region and a data region of the memory device according to a result of the determine.

According to an embodiment of the inventive concept, there is provided an operating method of a processor communicating with a storage device. The operating method includes allocating a tag region storing tag data and a data region storing normal data in the storage device when the processor is booted; designating at least a part of one of the tag region and the data region as a memory region on which a memory operation on the normal data is to be performed; and transmitting a first address and an access request for the normal data to the storage device, the first address indicating the memory region on which the memory operation on the normal data is to be performed.

BRIEF DESCRIPTION OF THE DRAWINGS

Embodiments will be more clearly understood from the following detailed description taken in conjunction with the accompanying drawings in which.

DETAILED DESCRIPTION

Figure 1:
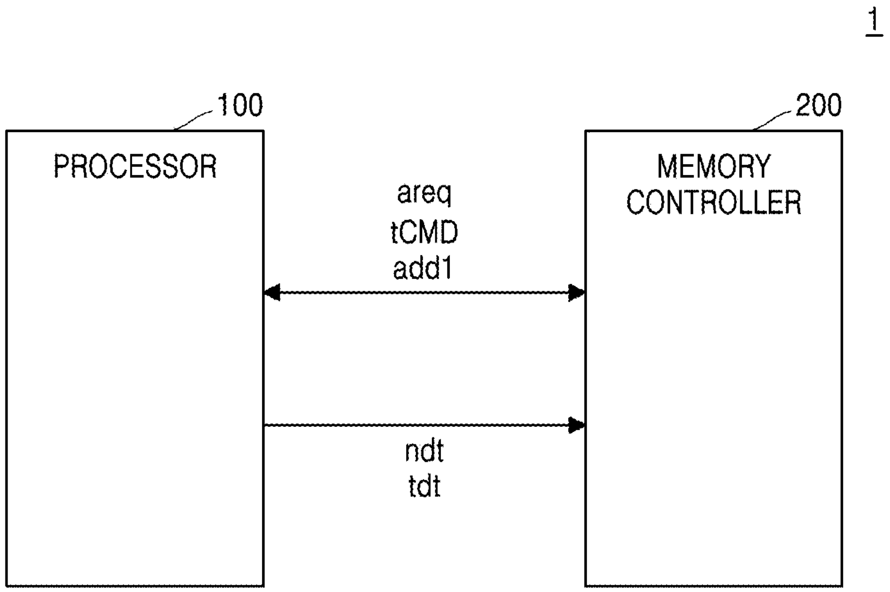
FIG. 1 is a block diagram of a system according to an embodiment.

Hereinafter, embodiments are described in detail with reference to the accompanying drawings. In the drawing, like reference characters denote like elements, and redundant descriptions thereof will be omitted.

FIG. 1 is a block diagram of a system 1 according to an embodiment.

Referring to FIG. 1, the system 1 may include a processor 100 and a memory controller 200 (e.g., a control circuit). The processor 100 and the memory controller 200 may be implemented as a single system-on-chip (SoC). The system 1 (e.g., the SoC) may be mounted on an electronic device. For example, the electronic device may include a mobile device, such as a smartphone, a tablet personal computer (PC), a personal digital assistant (PDA), a portable multimedia player (PMP), a laptop computer, a wearable device, a global positioning system (GPS) device, an e-book terminal, a digital broadcasting terminal, an MP3 player, a digital camera, a wearable computer, a navigation device, or a drone. For example, the electronic device may include an internet of things (IoT) device, a home appliance, or an advanced driver assistance system (ADAS).

The processor 100 may correspond to a functional block performing a computational operation. The processor 100 may correspond to a central processing unit (CPU), a digital signal processor (DSP), a graphics processing unit (GPU), or an application processor (AP).

The processor 100 may generally control operations of the system 1. The processor 100 may execute an operating system (OS) and various applications (e.g., application software programs) of an electronic device on which the system 1 is mounted. The processor 100 may process various kinds of arithmetic operations and/or logical operations. For example, the processor 100 may include a single-core processor or a multi-core processor.

The processor 100 may control the memory controller 200. The processor 100 may control the memory operations of the memory controller 200 with respect to a memory device. The memory device may be connected to the memory 200. The processor 100 may control the memory controller 200 by executing an OS. The processor 100 may issue or generate request signals for accessing the memory device by executing an OS and/or application software programs. The processor 100 may transmit request signals to the memory controller 200. The request signals may include an access request areq (e.g., a request signal), a first address add1, a tag command tCMD, normal data ndt, and tag data tdt.

The processor 100 may perform a normal operation and a tag operation. The normal operation may refer to a memory operation on the normal data ndt. The processor 100 may control the memory controller 200 to perform a memory operation, such as a write operation or a read operation, on the normal data ndt.

The tag operation may include a memory operation on the normal data ndt and a memory operation on the tag data tdt. The processor 100 may assign the tag data tdt to the normal data ndt during the tag operation and check data corruption through matching of the tag data tdt. For example, the data operation may be checked based on a match between the tag data tdt stored in a memory device and the tag data tdt intended by the processor 100. The check of the data corruption may determine whether the normal data ndt has become corrupted or changed to an unintended value. When the tag data stored in the memory device does not match the tag data intended by the processor 100, it may be identified that data corruption has occurred. When the tag data stored in the memory device matches the tag data intended by the processor 100, it may be identified that data corruption has not occurred. As described above, the tag operation may be performed to enhance memory security. To perform a memory operation on the tag data tdt, a memory device may need a memory region for storing the tag data tdt.

In the case where a tag region for the tag data tdt is allocated as a dedicated space in a memory device, the tag region may not be used even when a tag operation is not performed, which may be inefficient in securing memory space. Accordingly, a method of securing a tag region for a tag operation and increasing the efficiency of overall memory capacity is needed.

In an embodiment, the processor 100 fixes a start position of a tag region and the start position of a data region in a memory device to allocate the tag region and the data region. In an embodiment, the start position of the tag region and the start position of the data region do not change during runtime but may change after the system-on-chip is powered down and power is restored. The processor 100 may designate at least a part of either the tag region or the data region as a memory region for the normal data ndt. The processor 100 may designate a memory region for the normal data ndt in either the tag region or the data region. The processor 100 may execute an OS to designate a memory region for the normal data ndt. For example, the tag region may be allocated as a reserved region. In a normal operation, the tag region may be designated as a memory region for a memory operation. In an embodiment, the processor 100 does not allocate a tag region as a dedicated space for storing the tag data tdt, but dynamically stores the tag data tdt and the normal data ndt in the tag region, thereby efficiently securing memory capacity. For example, some of the tag data tdt may be stored in the tag region and the rest of the tag data tdt may be stored in the data region.

In a normal operation, the processor 100 may store the normal data ndt in a memory device or read the normal data ndt from the memory device. The processor 100 may transmit the access request areq to the memory controller 200. The processor 100 may transmit the access request areq for a read or write operation to the memory controller 200 to read the normal data ndt from the memory device or write the normal data ndt after being processed to the memory device. For example, when the access request areq is a write request, the processor 100 may transmit the normal data ndt to be written to the memory controller 200. When the access request areq is a read request, the normal data ndt is not transmitted to the memory controller 200.

When issuing the access request areq, the processor 100 may designate a memory region on which a memory operation on the normal data ndt is to be performed. A memory device may include a tag region and a data region. In general, the tag region may store the tag data tdt and the data region may store the normal data ndt. The tag region and the data region are described in detail with reference to FIG. 3 below.

In an embodiment, the processor 100 designates a memory region in either a tag region or a data region during a normal operation. During the normal operation, the memory region may be at least a part of either the tag region or the data region. In other words, the normal data ndt may be stored in either the data region or the tag region. The processor 100 may generate the first address add1 indicating the memory region designated for the normal data ndt. The processor 100 may transmit the first address add1 to the memory controller 200. In an embodiment, the processor 100 does not allocate a tag region as a dedicated space for storing the tag data tdt but dynamically stores the tag data tdt and the normal data ndt in the tag region, thereby efficiently securing memory capacity. For example, the processor 100 may store the normal data ndt in the data region or the tag region and store the tag data tdt in the tag region; or store part of the normal data ndt in the data region, store a remaining part of the normal data ndt in the tag region and store the tag data tdt in the tag region.

In a tag operation, the processor 100 may store at least one of the normal data ndt and the tag data tdt in a memory device or read at least one of the normal data ndt and the tag data tdt from the memory device. The processor 100 may transmit the access request areq to the memory controller 200 in the tag operation. In the tag operation, the processor 100 may generate the tag command tCMD. The tag command tCMD may be a command for performing a memory operation on the tag data tdt. The processor 100 may transmit the tag command tCMD to the memory controller 200.

For example, when the processor 100 transmits the access request areq and the tag command tCMD to the memory controller 200, the processor 100 may assign the tag data tdt corresponding to the normal data ndt to be written and transmit the tag data tdt and the normal data ndt to the memory controller 200. For example, the processor 100 may transmit the access request areq corresponding to a read request and the tag command tCMD to the memory controller 200.

When issuing the access request areq, the processor 100 may designate a memory region on which a memory operation on the normal data ndt and the tag data tdt is to be performed. For example, the processor 100 may execute an OS to designate the memory region. In an embodiment, during a tag operation, the processor 100 may designate at least a part of a data region in a memory device as a memory region for the normal data ndt and at least a part of a tag region in the memory device as a memory region for the tag data tdt. In other words, during the tag operation, the normal data ndt may be written to or read from the data region and the tag data tdt may be written to or read from the tag region.

The processor 100 may generate the first address add1 indicating a memory region designated for the normal data ndt. The processor 100 may transmit the first address add1 to the memory controller 200. During a tag operation, the first address add1 may indicate a data region. The processor 100 may designate the memory region for the normal data ndt in either a data region or a tag region in a normal operation and may designate the memory region for the normal data ndt in the data region in a tag operation.

The memory controller 200 may generally control operations of a memory device. The memory controller 200 may be implemented as a memory device and a storage device. The memory controller 200 may generally control data exchange between the processor 100 and the memory device. For example, the memory controller 200 may control the memory device to write data or read data at the request of the processor 100. The memory controller 200 may generate a command for controlling the memory device.

The memory controller 200 may control the memory device based on request signals received from the processor 100. The memory controller 200 may perform a normal operation and a tag operation on the memory device. For example, the memory controller 200 may perform the normal operation when the memory controller 200 does not receive the tag command tCMD. The memory controller 200 may perform a memory operation on the normal data ndt based on the first address add1. When the first address add1 indicates a memory region in a data region, the memory controller 200 may write the normal data ndt to the data region or read the normal data ndt from the data region. When the first address add1 indicates a memory region in a tag region, the memory controller 200 may write the normal data ndt to the tag region or read the normal data ndt from the tag region.

For example, the memory controller 200 may perform a tag operation when receiving the tag command tCMD. The memory controller 200 may perform a memory operation on the normal data ndt based on the first address add1. Because a data region is designated as a memory region for the normal data ndt during the tag operation, the memory controller 200 may write the normal data ndt to or read the normal data ndt from the data region indicated by the first address add1.

The memory controller 200 may receive the tag data tdt together with the tag command tCMD. In an embodiment, the memory controller 200 generates a second address add2 (see FIG. 6B) based on the first address add1. The second address add2 may indicate a memory region for the tag data tdt. According to an embodiment, when the system 1 is booted, the position of each of a data region and a tag region in a memory device is fixed. For example, the start position of each of the data region and the tag region in the memory device may be fixed. For example, the start position of each of the data region and the tag region in the memory device may be calculated when the system 1 is booted and prevented from changing thereafter. Because the first address add1 indicates the data region designated for the normal data ndt, the memory controller 200 may calculate a memory region that is designated for the tag data tdt corresponding to the normal data ndt. The memory controller 200 may write the tag data tdt to or read the tag data tdt from the tag region based on the second address add2. The memory controller 200 may write the tag data tdt to or read the tag data tdt from the tag region indicated by the second address add2.

A memory device may store data or output the stored data. For example, the memory device may include dynamic random access memory (DRAM) but is not limited thereto. The memory device may include DRAM, such as double data rate (DDR) synchronous DRAM (SDRAM), low power DDR (LPDDR) SDRAM, graphics DDR (GDDR) SDRAM, or Rambus (DRAM) (RDRAM). The memory device may include a tag region and a data region.

Figure 2:
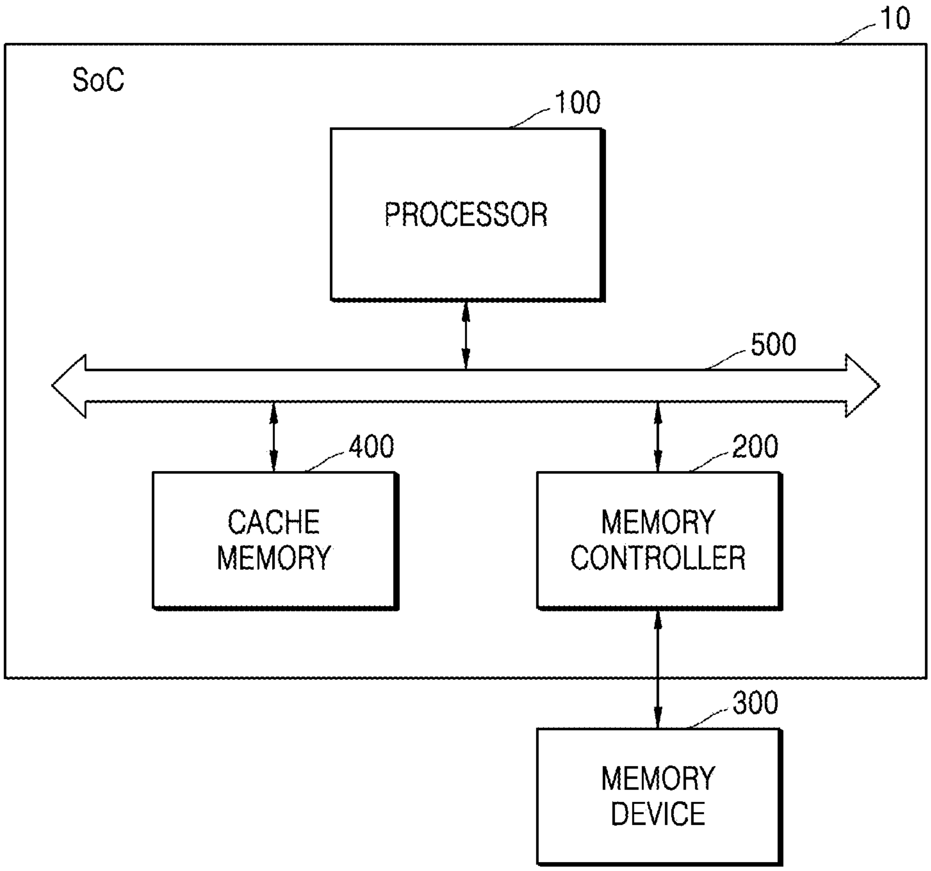
FIG. 2 is a block diagram illustrating a system-on-chip (SoC) according to an embodiment.

FIG. 2 is a block diagram illustrating an SoC 10 according to an embodiment. The processor 100 and the memory controller 200 in FIG. 2 respectively correspond to the processor 100 and the memory controller 200 in FIG. 1, and thus, redundant descriptions thereof are omitted.

The SoC 10 may be mounted on an electronic device, such as a smartphone, a tablet PC, or a PDA. The SoC 10 may correspond to a controller or a processor, which controls operations of the electronic device. The SoC 10 may refer to an AP, a mobile AP, or a control chip.

Referring to FIG. 2, the SoC 10 may include the processor 100 and the memory controller 200. The SoC 10 may further include a cache memory 400, a system bus 500, a communication functional module, an image sensor module, and the like. The components, e.g., the processor 100, the cache memory 400, and the memory controller 200, of the SoC 10 may exchange data with each other through the system bus 500.

The processor 100 may generally control operations of the SoC 10. The processor 100 may execute an OS and various applications (e.g., application software programs) of an electronic device on which the SoC 10 is mounted. The processor 100 may process various kinds of arithmetic operations and/or logical operations. When accessing a memory device 300, the processor 100 may output an access request and a first address to the system bus 500. For example, when accessing the memory device 300 for a write operation, the processor 100 may output normal data to the system bus 500. When accessing the memory device 300 for a tag operation, the processor 100 may output a tag command, tag data, and the like to the system bus 500.

The cache memory 400 may be used when the processor 100 performs various operations. The cache memory 400 may temporarily store instructions and/or parameter values, which are used for the processor 100 to execute an OS and applications. The cache memory 400 may be omitted according to embodiments.

The memory controller 200 may control the memory device 300. The memory device 300 may exchange data with other components of the SoC 10 through the memory controller 200. Although it is illustrated in FIG. 2 that the memory device 300 is not included in the SoC 10, embodiments are not limited thereto. According to embodiments, the memory device 300 may be implemented in a single SoC together with at least one of the memory controller 200 and the processor 100.

The memory controller 200 may be connected to the memory device 300 through a memory interface. The memory controller 200 and the memory device 300 may be connected to each other through a single signal line or a plurality of signals and lines. The memory interface may include connectors that connect the memory controller 200 to the memory device 300. The connectors may include pins, balls, signal lines, or other hardware components. For example, a clock signal, a command, an address, and data may be exchanged between the memory controller 200 and the memory device 300 through the memory interface.

The memory device 300 may temporarily store data that has been processed by the processor 100 or data to be processed by the processor 100. The memory device 300 may include volatile memory, such as DRAM, static RAM (SRAM), or SDRAM, and/or non-volatile memory, such as phase-change RAM (PRAM), magnetoresistive RAM (MRAM), resistive RAM (ReRAM), or ferroelectric RAM (FRAM). However, for convenience of description, it is assumed hereinafter that the memory device 300 includes DRAM.

The system bus 500 may connect components, e.g., the processor 100, the memory controller 200, and the cache memory 400, of the SoC 10 to one another and may provide a transmission path for data or a signal among the components of the SoC 10.

In an embodiment, the system bus 500 may be implemented by a network-on-chip (NoC). An NoC connects processing circuits of a semiconductor chip to each other by applying packet or circuit network technology for normal computers or communication devices to the semiconductor chip.

In an embodiment, the system bus 500 may be formed as an NoC to which a protocol having a certain bus standard specification is applied. For example, the advanced microcontroller bus architecture (AMBA protocol of Advanced RISC Machine (ARM) may be used as the standard bus specification. Bus types of the AMBA protocol may include an advanced high-performance bus (AHB), an advanced peripheral bus (APB), an advanced extensible interface (AXI), AXI4, and AXI coherency extensions (ACE). Among these bus types, AXI as an interface protocol among functional blocks, may provide a multiple outstanding address function, a data interleaving function, and/or the like. Besides the above, other types of protocols, such as uNetwork of SONICs Inc., CoreConnect of IBM, and Open Core Protocol of OCP-IP, may be applied to the system bus 500.

The system bus 500 may receive an access request and a first address from a component, e.g., the processor 100, of the SoC 10 and transmit the access request and the first address to the memory controller 200. The memory controller 200 may perform a memory operation on the memory device 300, based on the first address and the access request. The memory controller 200 may transmit, to the system bus 500, a processing result or response involved in the access request. The system bus 500 may transmit the response to the component that has provided the access request.

Figure 3:
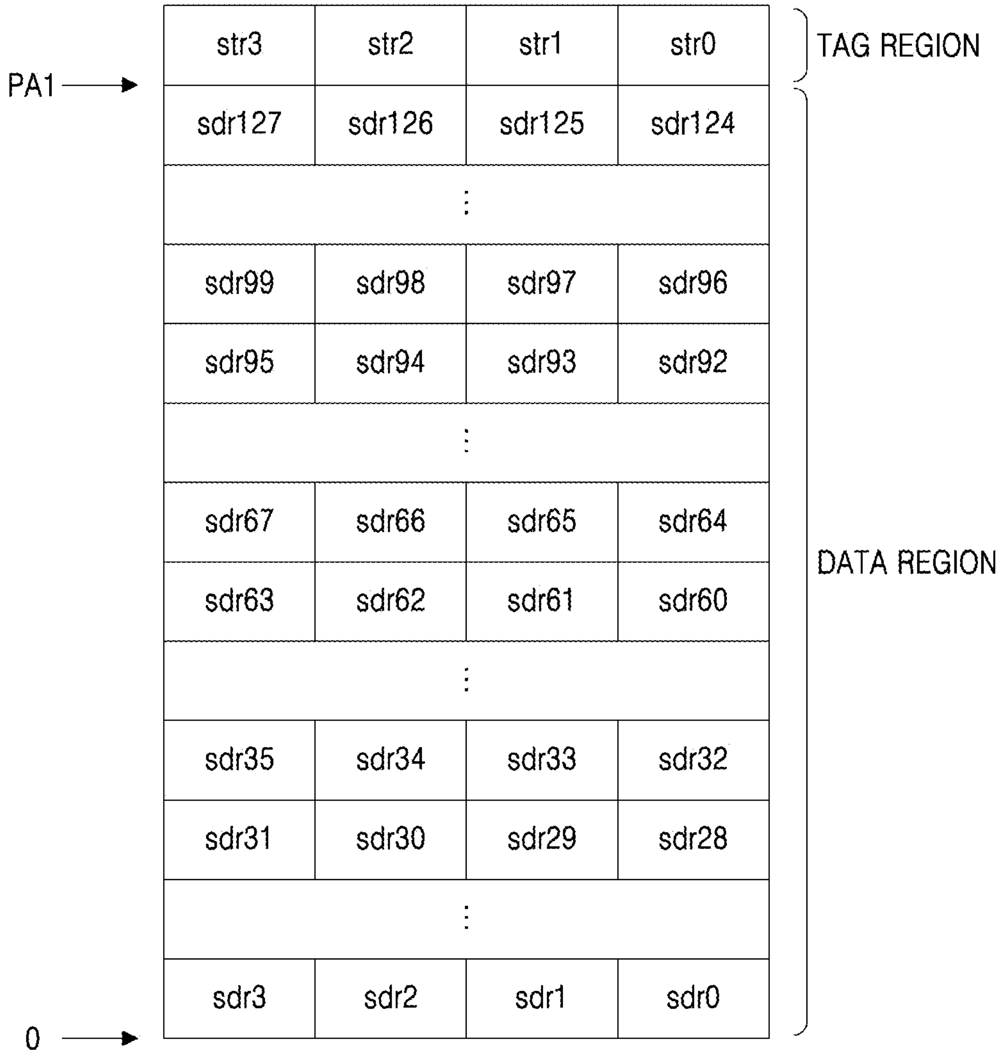
FIG. 3 is a diagram illustrating the structure of a memory device, according to an embodiment.

FIG. 3 is a diagram illustrating the structure of the memory device, according to an embodiment. Redundant descriptions given above are omitted below.

Referring to FIG. 3, the memory device (for example, the memory device 300 in FIG. 2) includes a tag region and a data region. The tag region may refer to memory regions in which tag data is stored in the memory device 300. The data region may refer to memory regions in which normal data is stored in the memory device 300. The tag region and the data region may each include a plurality of sub regions. Each of the sub regions may correspond to a memory region on which a memory operation is performed on tag data or normal data. The tag region may include a plurality of sub tag regions and the data region may include a plurality of sub data regions. For example, a sub tag region and a sub data region may each correspond to a page. For example, a single page may be 4 kilobytes (KB) in size but is not limited thereto. The size of a page may vary.

The tag region may include sub tag regions corresponding to sub data regions. For example, a first sub tag region str0 may correspond to first to 32nd sub data regions sdr0 to sdr31. Pieces of tag data respectively corresponding to pieces of normal data respectively stored in the first to 32nd sub data regions sdr0 to sdr31 may be stored in the first sub tag region str0. A second sub tag region str1 may correspond to 33rd to 64th sub data regions sdr32 to sdr63. Pieces of tag data respectively corresponding to pieces of normal data respectively stored in the 33rd to 64th sub data regions sdr32 to sdr63 may be stored in the second sub tag region str1. A third sub tag region str2 may correspond to 65th to 96th sub data regions sdr64 to sdr95. Pieces of tag data respectively corresponding to pieces of normal data respectively stored in the 65th to 96th sub data regions sdr64 to sdr95 may be stored in the third sub tag region str2. A fourth sub tag region str3 may correspond to 97th to 128th sub data regions sdr96 to sdr127. Pieces of tag data respectively corresponding to pieces of normal data respectively stored in the 97th to 128th sub data regions sdr96 to sdr127 may be stored in the fourth sub tag region str3.

For example, during a tag operation, a processor (e.g., the processor 100 in FIG. 1) may designate the first sub data region sdr0 as a memory region for the first normal data and the first sub tag region str0 as a memory region for the first tag data. The processor may transmit a first address indicating the first sub data region sdr0 to a memory controller. The memory controller (e.g., the memory controller 200 in FIG. 1) may store the first normal data in the first sub data region sdr0 based on the first address and may store the first tag data in the first sub tag region str0 based on the second address.

In an embodiment, the size and/or position of each of the tag region and the data region is determined when an SoC (e.g., the SoC 10 in FIG. 2) is booted. The tag region may correspond to a reserved region. In an embodiment, when the SoC is booted, the position of each of the tag region and the data region in the memory device 300 is fixed. For example, the data region may range from physical address 0 to a first physical address PA1. The tag region may begin from the first physical address PA1. The processor may fix physical address 0 to the start position of the data region and the first physical address PA1 to the start position of the tag region. For example, an address indicating the start position of the data region may refer to a normal address and an address indicating the start position of the tag region may refer to a tag address. For example, the normal address may be 0 and the tag address may be the first physical address PA1.

Because the position of the tag region and the position of the data region are fixed in the memory device 300, the second address may be calculated based on the first address. During the tag operation, the first address may be a physical address from among physical address 0 to the first physical address PA1 and the second address may be a physical address starting from the first physical address PA1. The second address may be calculated starting from the first physical address PA1 according to the size of the range from physical address 0 to the first address. For example, when the first address indicating a memory region for the first normal data is physical address 0, the memory controller may calculate the second address, which indicates a memory region for the first tag data, as the first physical address PA1. In an embodiment, the memory controller adds an offset to the first address based on a size of the data region to calculate the second address.

Figure 4A:
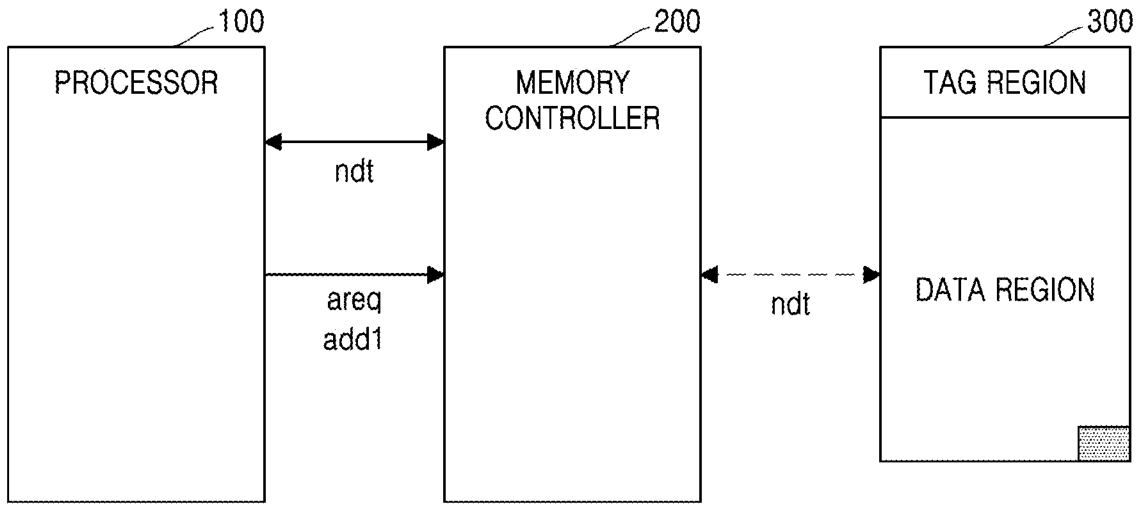
FIG. 4A is a diagram illustrating a normal operation according to an embodiment.

FIG. 4A is a diagram illustrating a normal operation according to an embodiment. In detail, FIG. 4A illustrates the case where a data region is designated as a memory region for the normal data ndt. Redundant descriptions given above are omitted.

The processor 100 may perform a normal operation. The processor 100 may designate a memory region for the normal data ndt in either a tag region or a data region. The processor 100 may execute an OS to designate the memory region for the normal data ndt. The processor 100 may designate the data region as the memory region for the normal data ndt. For example, the processor 100 may designate a first sub data region as the memory region for the normal data ndt. The processor 100 may generate the first address add1 indicating the data region designated for the normal data ndt. For example, the first address add1 may indicate the first sub data region.

The processor 100 may transmit, to the memory device 300, the access request areq for a write or a read operation to write the normal data ndt after being processed to the memory device 300 or read the normal data ndt from the memory device 300. For example, when the access request areq is a write request, the processor 100 may transmit the normal data ndt to be written and the first address add1 to the memory controller 200 together with the access request areq. When the access request areq is a read request, the processor 100 may transmit the first address add1 to the memory controller 200 together with the access request areq.

The memory controller 200 may control the memory device 300 based on request signals received from the processor 100. For example, the memory controller 200 may perform a normal operation when the memory controller 200 does not receive a tag command. The memory controller 200 may write the normal data ndt to the memory device 300 or read the normal data ndt from the memory device 300. When the access request areq is a write request, the memory controller 200 may write the normal data ndt to the memory region designated in the data region based on the first address add1. When the access request areq is a read request, the memory controller 200 may read the normal data ndt from the memory region designated in the data region based on the first address add1.

Figure 4B:
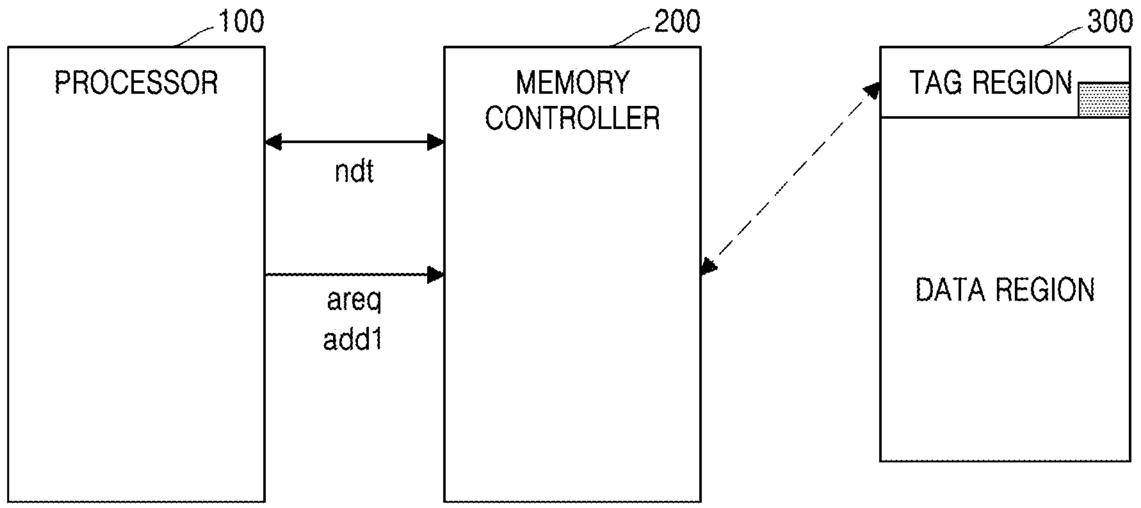
FIG. 4B is a diagram illustrating a normal operation according to an embodiment.

FIG. 4B is a diagram illustrating a normal operation according to an embodiment. In detail, FIG. 4B illustrates the case where a tag region is designated as a memory region for the normal data ndt. Redundant descriptions given above are omitted.

The processor 100 may designate a tag region as a memory region for the normal data ndt in the normal operation. For example, the processor 100 may designate a first sub tag region as the memory region for the normal data ndt. The processor 100 may generate the first address add1 indicating the tag region designated for the normal data ndt. For example, the first address add1 may indicate the first sub tag region. In an embodiment, when an amount of the data region that is free is less than a certain amount or the data region is full, the processor 100 generates the first address add1 to store the normal data ndt in the tag region.

The memory controller 200 may perform a normal operation when the memory controller 200 does not receive a tag command. When the access request areq is a write request, the memory controller 200 may write the normal data ndt to the memory region designated in the tag region based on the first address add1. For example, the memory controller 200 may write the normal data ndt to the first sub tag region. When the access request areq is a read request, the memory controller 200 may read the normal data ndt from the memory region designated in the tag region based on the first address add1. For example, the memory controller 200 may read the normal data ndt from the first sub tag region.

According to an embodiment of the inventive concept, an SoC does not allocate a tag region as a dedicated space for storing tag data but dynamically allocates the tag region for a memory region for either tag data or normal data, thereby efficiently securing memory capacity and increasing the performance of the SoC. For example, normal data may be stored in the data region or the tag region.

Figure 5:
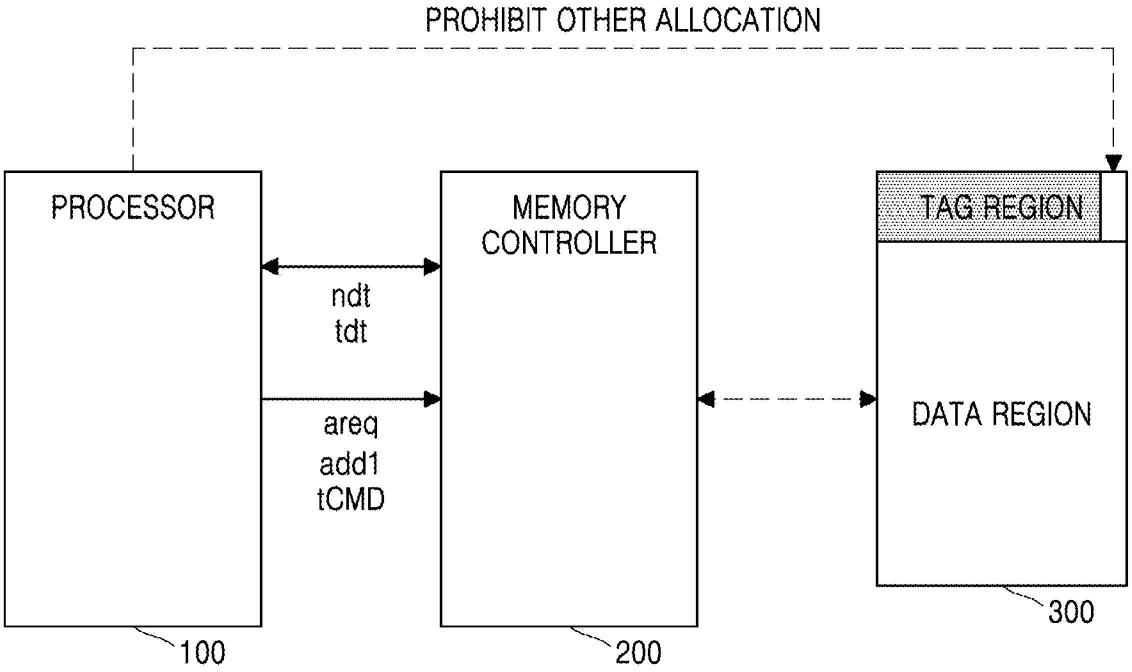
FIG. 5 is a diagram illustrating a tag operation according to an embodiment.

FIG. 5 is a diagram illustrating a tag operation according to an embodiment. FIG. 5 illustrates that the processor 100 designates a data region as a memory region for the normal data ndt and a tag region as a memory region for the tag data tdt in a tag operation. Redundant descriptions given above are omitted.

Referring to FIG. 5, the processor 100 may perform a tag operation. The tag operation may include a memory operation on the normal data ndt and a memory operation on the tag data tdt. During the tag operation, the processor 100 may assign the tag data tdt to the normal data ndt and designate a memory region for the tag data tdt and the normal data ndt. In an embodiment, the processor 100 may execute an OS to allocate a data region for a memory region for the normal data ndt and allocate a tag region for a memory region for the tag data tdt. The processor 100 may generate the first address add1 indicating the data region designated for the normal data ndt. For example, the first address add1 may indicate the first sub data region.

During the tag operation, the processor 100 may transmit the access request areq to the memory controller 200 to store at least one of the normal data ndt and the tag data tdt in the memory device 300 or read at least one of the normal data ndt and the tag data tdt from the memory device 300. The processor 100 may also generate the tag command tCMD during the tag operation. The tag command tCMD is a command for performing a memory operation on the tag data tdt. The processor 100 may transmit the tag command tCMD to the memory controller 200 to perform a tag operation.

For example, when the processor 100 transmits the access request areq corresponding to a write request and the tag command tCMD to the memory controller 200, the processor 100 may assign the tag data tdt corresponding to the normal data ndt to be written and may transmit the tag data tdt, the first address add1, and the normal data ndt to the memory controller 200. For example, the processor 100 may transmit the access request areq corresponding to a read request, the first address add1, and the tag command tCMD to the memory controller 200.

In an embodiment, the processor 100 prohibits allocation of the tag region for a memory region, on which a memory operation on other normal data and other tag data is to be performed. The processor 100 may generate the second address. The second address may indicate a tag region on which a memory operation on the tag data tdt is to be performed. The processor 100 may execute an OS to prohibit the tag region indicated by the second address from being designated as a memory region for other normal data and tag data. Because the tag region indicated by the second address is designated as the memory region for the tag data tdt, when the tag region is designated as a memory region for other data, data corruption may occur.

In an embodiment, the processor 100 does not designate the tag region indicated by the second address as a memory region for other data. For example, it is assumed that the processor 100 designates the first sub tag region for the first tag data corresponding to the first normal data. The second address may indicate the first sub tag region. The processor 100 may prohibit the first sub tag region from being designated as a memory region for second normal data other than the first tag data. For example, assuming that the first sub tag region corresponds to the first to 32nd sub data regions, the processor 100 may prohibit the first sub tag region from being designated as a memory region for the 35th tag data corresponding to the 35th normal data.

Figure 6A:
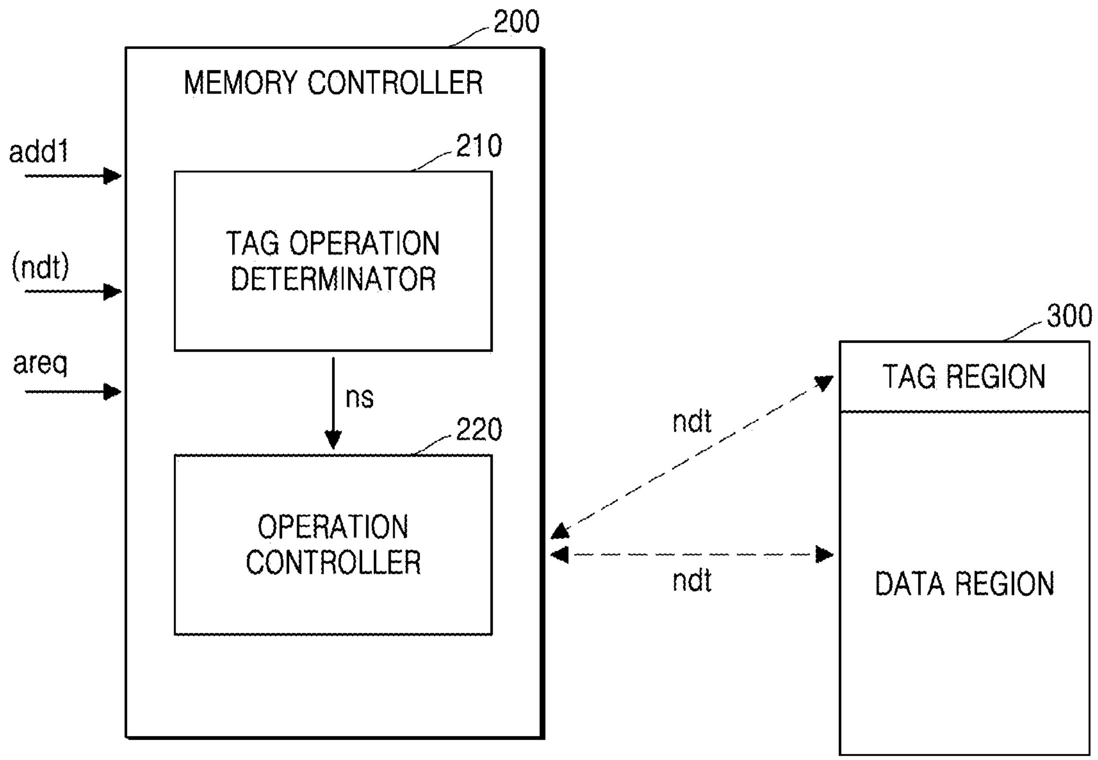
FIG. 6A is a diagram illustrating the operation of a memory controller during a normal operation, according to an embodiment.

FIG. 6A is a diagram illustrating the operation of a memory controller during a normal operation, according to an embodiment. FIG. 6A illustrates the operation of the memory controller 200 during a normal operation. Although it is illustrated in FIG. 6A that a tag operation determinator 210 is separate from an operation controller 220, embodiments are not limited thereto. The tag operation determinator 210 and the operation controller 220 may be implemented as one component. Redundant descriptions given above are omitted.

The memory controller 200 may determine whether a tag command has been received and perform a normal operation or a tag operation according to whether the tag command has been received.

Referring to FIG. 6A, the memory controller 200 may include the tag operation determinator 210 (e.g., a logic circuit) and the operation controller 220 (e.g., a control circuit). The tag operation determinator 210 may determine whether to perform a tag operation or a normal operation on the normal data ndt based on a tag command. In detail, the tag operation determinator 210 may determine whether to perform a tag operation or a normal operation based on whether a tag command has been received.

When a tag command has not been received, the tag operation determinator 210 may determine to perform a normal operation. Because the tag operation determinator 210 has not received a tag command, the tag operation determinator 210 may determine to perform a normal operation on the normal data ndt. The tag operation determinator 210 may transmit a normal operation signal ns to the operation controller 220. For example, the tag operation determinator 210 may transmit a normal operation signal ns to the operation controller 220 when it determines to perform a normal operation on the normal data ndt.

The operation controller 220 may perform a memory operation on the normal data ndt according to the determination of the tag operation determinator 210. Because the tag operation determinator 210 determines to perform a normal operation, the operation controller 220 may perform the normal operation on the normal data ndt. The operation controller 220 may receive the normal operation signal ns and perform a memory operation on the normal data ndt. The operation controller 220 may receive the first address add1 and perform a memory operation on the normal data ndt on a memory region indicated by the first address add1. For example, the operation controller 220 may perform the memory operation on the normal data ndt on a memory region indicated by the first address add1 when the normal operation signal ns is received.

When the first address add1 indicates a tag region of the memory device 300, the operation controller 220 may perform a memory operation on the normal data ndt in the tag region corresponding to the first address add1. For example, when the tag region corresponding to the first address add1 is the first sub tag region, the operation controller 220 may read the normal data ndt from the first sub tag region or write the normal data ndt to the first sub tag region.

When the first address add1 indicates a data region of the memory device 300, the operation controller 220 may perform a memory operation on the normal data ndt in the data region corresponding to the first address add1. For example, when the tag region corresponding to the first address add1 is the first sub data region, the operation controller 220 may read the normal data ndt from the first sub data region or write the normal data ndt to the first sub data region. Because the tag region is not exclusively used as a memory region for tag data but is also used as a memory region for normal data ndt, memory security may be enhanced and memory capacity may be efficiently secured.

Figure 6B:
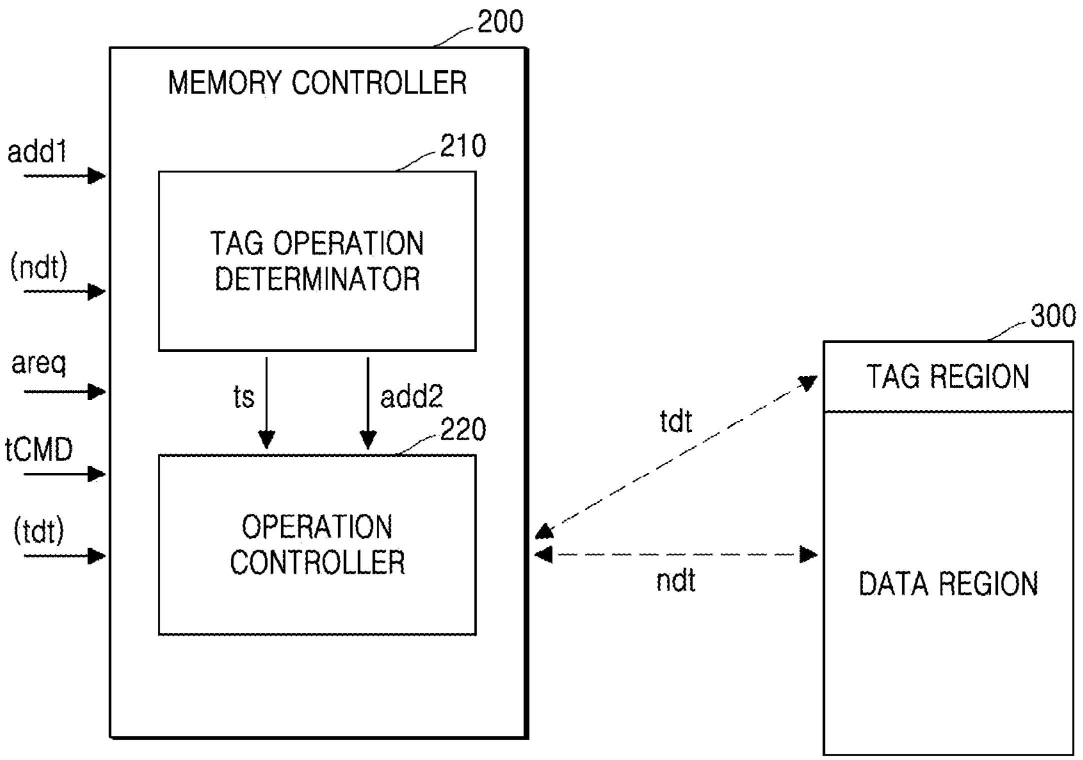
FIG. 6B is a diagram illustrating the operation of a memory controller during a tag operation, according to an embodiment.

FIG. 6B is a diagram illustrating the operation of a memory controller during a tag operation, according to an embodiment. FIG. 6B illustrates the operation of the memory controller 200 during a tag operation. Redundant descriptions given above are omitted.

Referring to FIG. 6B, the tag operation determinator 210 may determine whether to perform a tag operation or a normal operation based on whether the tag command tCMD is received. When receiving the tag command tCMD, the tag operation determinator 210 may determine to perform a tag operation. Because the tag operation determinator 210 receives the tag command tCMD, the tag operation determinator 210 may determine to perform a tag operation on the normal data ndt. In other words, the memory controller 200 may perform a memory operation on the normal data ndt and a memory operation on the tag data tdt. The tag operation determinator 210 may transmit a tag operation signal ts to the operation controller 220. For example, the tag operation determinator 210 may transmit a tag operation signal ts to the operation controller 220 upon receiving the tag command tCMD.

In an embodiment, when receiving the tag command tCMD, the tag operation determinator 210 generates the second address add2 based on the first address add1. The second address add2 may indicate a memory region on which a memory operation on the tag data tdt is performed. The second address add2 may indicate a memory region that is designated by a processor for the tag data tdt. Because the position of a tag region and the position of a data region are fixed in the memory device 300, the tag operation determinator 210 may calculate the second address add2 based on the first address add1. For example, the tag operation determinator 210 may add a offset to the first address add1 to calculate the second address add2. The tag operation determinator 210 may transmit the second address add2 to the operation controller 220. In some embodiments, the operation controller 220 may generate the second address add2 based on the first address add1. For example, in one of these embodiments, the operation controller 220 receives the first address add1 from the tag operation determinator 210 and generates the second address add2 based on the received address.

The operation controller 220 may perform a memory operation on the normal data ndt and the tag data tdt according to the determination of the tag operation determinator 210. Because the tag operation determinator 210 determines to perform a tag operation, the operation controller 220 may perform a tag operation on the normal data ndt. The operation controller 220 may receive the tag operation signal ts and perform a tag operation on the normal data ndt. For example, the operation controller 220 may perform a tag operation on the normal data ndt upon receiving the tag operation signal ts.

The operation controller 220 may receive the first address add1 and perform a memory operation on the normal data ndt on a memory region indicated by the first address add1. Because at least a part of the data region is designated as the memory region for the normal data ndt, the operation controller 220 may perform a memory operation on the normal data ndt in the data region corresponding to the first address add1.

The operation controller 220 may receive the second address add2 and perform a memory operation on the tag data tdt in a memory region indicated by the second address add2. Because at least a part of the tag region is designated as the memory region for the tag data tdt, the operation controller 220 may perform a memory operation on the tag data tdt in the tag region corresponding to the second address add2.

When the access request areq is a write request, the operation controller 220 may write the normal data ndt to the data region based on the first address add1 and write the tag data tdt to the tag region based on the second address add2. When the access request areq is a read request, the operation controller 220 may read the normal data ndt from the data region based on the first address add1 and read the tag data tdt from the tag region based on the second address add2.

During the tag operation, a processor may incorrectly designate the tag region as the memory region for the normal data ndt. In an embodiment, when a tag operation on the normal data ndt is determined to be performed and the first address add1 indicates a memory region in the tag region, the operation controller 220 may ignore the determination to perform a tag operation on the normal data ndt. Although the tag operation determinator 210 determines to perform a tag operation based on the tag command tCMD, the operation controller 220 does not perform a memory operation on the normal data ndt when a memory region designated for the normal data ndt corresponds to a tag region.

In the case of a tag operation, a memory operation may be performed on the tag data tdt to determine matching of the tag data tdt. With the access request areq, matching of the tag data tdt may also be determined. Whether the tag data tdt generated by a processor matches the tag data read from the memory device 300 may be determined, and data corruption may be determined. Matching of tag data is described with reference to FIGS. 7 and 8 below.

Figure 7:
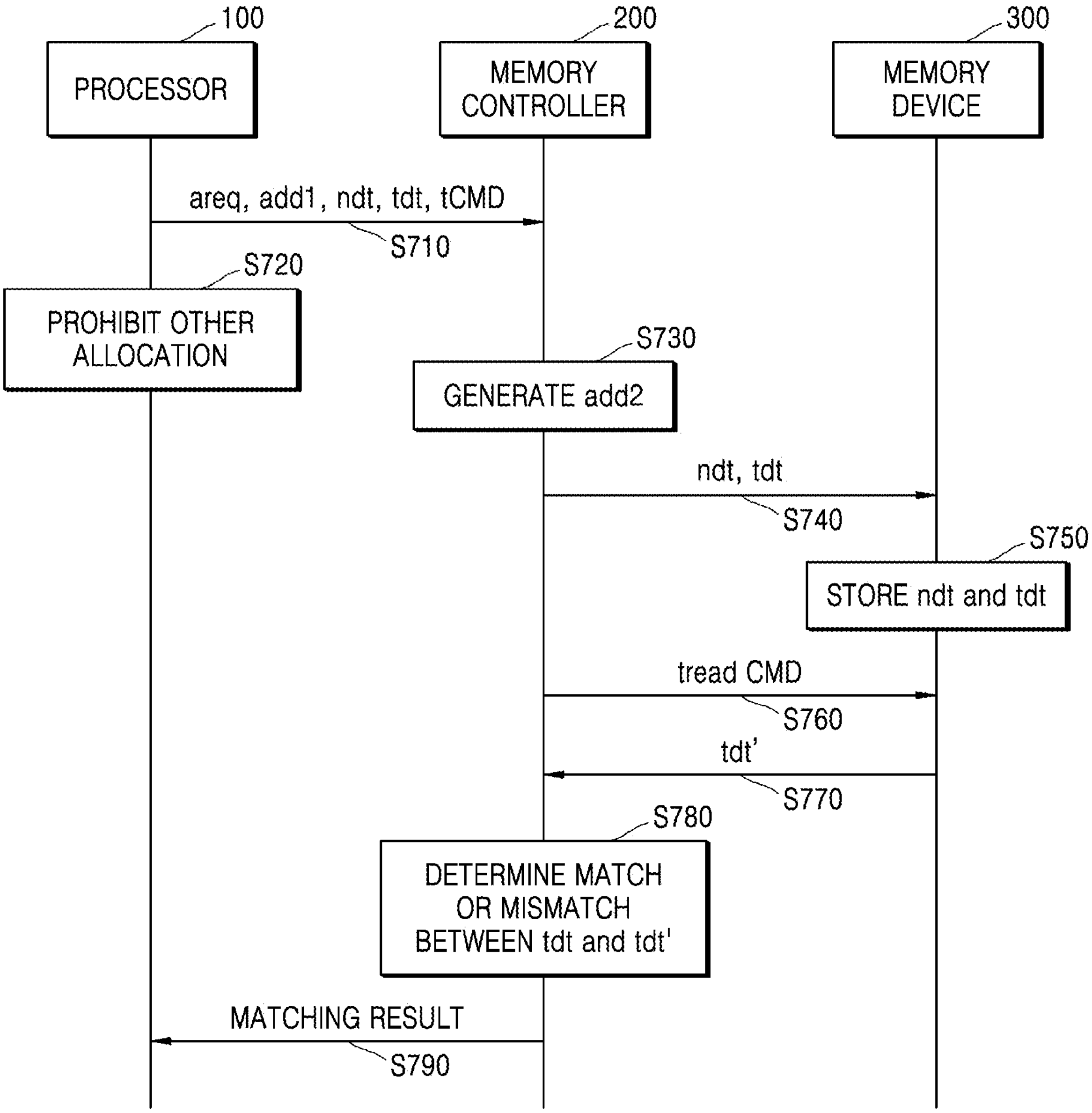
FIG. 7 is a diagram illustrating a write operation according to an embodiment.

FIG. 7 is a diagram illustrating a write operation according to an embodiment. FIG. 7 illustrates a method of performing a write operation during a tag operation. Redundant descriptions given above are omitted.

To perform a write operation, the processor 100 may transmit the access request areq, the normal data ndt, and the first address add1 to the memory controller 200. To perform a tag operation, the processor 100 may also transmit the tag command tCMD and the tag data tdt to the memory controller 200 in operation S710. The tag operation may include a memory operation on the normal data ndt and a memory operation on the tag data tdt. The processor 100 may perform a tag operation to enhance memory security. During the tag operation, the processor 100 may assign the tag data tdt to the normal data ndt, perform a memory operation on the tag data tdt, and check matching of the tag data tdt.

During the tag operation, the processor 100 may transmit the access request areq corresponding to a write operation to the memory controller 200. During the tag operation, the processor 100 may generate the tag command tCMD. The tag command tCMD may be a command for performing a memory operation on the tag data tdt. The processor 100 may designate a memory region on which a memory operation on each of the normal data ndt and the tag data tdt is to be performed. The processor 100 may designate at least a part of a data region of the memory device 300 as the memory region for the normal data ndt and at least a part of a tag region of the memory device 300 as the memory region for the tag data tdt. The processor 100 may generate the first address add1 indicating the memory region designated for the normal data ndt. The processor 100 may transmit the first address add1 to the memory controller 200.

The processor 100 may prohibit designation of the tag region as a memory region, on which a memory operation on other normal data and other tag data is to be performed, in operation S720. The processor 100 may execute an OS to prohibit a tag region indicated by a second address from being designated as a memory region for other normal data and tag data. The second address may indicate a tag region on which a memory operation on the tag data tdt is to be performed. The tag region indicated by the second address has been designated as the memory region for the tag data tdt and may thus be corrupt when the tag region is designated as a memory region for other data. The processor 100 may not designate the tag region indicated by the second address as a memory region for other data. For example, if a first portion of the tag region indicated by the second address has been designated as a memory region for first tag data, the processor may prohibit the first portion from being designated as the memory region for second normal data different from the first normal tag or allow a second other portion of the tag region to be designated as the memory region for the second normal data.

The memory controller 200 may receive the access request areq, the normal data ndt, the first address add1, the tag command tCMD, and the tag data tdt from the processor 100. The memory controller 200 may control the memory device 300 based on request signals received from the processor 100. The memory controller 200 may also generate a command for controlling the memory device 300.

Because the memory controller 200 receives the tag command tCMD, the memory controller 200 may perform a tag operation. The memory controller 200 generates the second address add2 based on the first address add1 in operation S730. The second address add2 may indicate a memory region for the tag data tdt. Although it is illustrated in FIG. 7 that operation S730 follows operation S720, embodiments are not limited thereto. For example, operation S720 may follow operation S730 or operations S720 and S730 may be simultaneously performed.

The memory controller 200 may transmit the normal data ndt and the tag data tdt to the memory device 300 in operation S740. The memory controller 200 may also transmit, to the memory device 300, a write command for writing the normal data ndt and the tag data tdt to the memory device 300. The memory controller 200 may control the memory device 300 to write the normal data ndt to the data region based on the first address add1 and write the tag data tdt to the tag region based on the second address add2.

The memory device 300 stores the normal data ndt and the tag data tdt in operation S750. The memory device 300 may write the normal data ndt to the data region corresponding to the first address add1. The memory device 300 may write the tag data tdt to the tag region corresponding to the second address add2.

The memory controller 200 generates and transmit a read command "tread CMD" for reading a tag to the memory device 300 in operation S760. During the tag operation, the memory controller 200 reads tag data tdt' from the memory device 300 to determine match or mismatch of the tag data tdt. During the tag operation, the tag data tdt may be transmitted from the processor 100 and written to the tag region indicated by the second address add2 and the tag data tdt' may be read from the tag region indicated by the second address add2.

The memory device 300 reads the tag data tdt' in response to the read command "tread CMD" in operation S770. The memory device 300 may read the tag data tdt' from the tag region indicated by the second address add2 and transmit the tag data tdt' to the memory controller 200.

The memory controller 200 determines whether the tag data tdt matches the tag data tdt' in operation S780. For example, the memory controller 200 may compare the tag data tdt with the tag data tdt' to determine a matching result. The memory controller 200 transmits the matching result obtained by determining match or mismatch between the tag data tdt and the tag data tdt' in operation S790. For example, the memory controller 200 may transmit the matching result to the processor 100. The memory controller 200 may determine whether the tag data tdt is identical to the tag data tdt'. Data corruption may be checked based on whether the tag data tdt' stored in the memory device 300 matches the tag data tdt intended by the processor 100.

When data corruption occurs between when the memory device 300 writes the tag data tdt in operation S750 and when the memory device 300 reads the tag data tdt' in operation S770, the tag data tdt may be different from the tag data tdt'. When the tag data tdt intended by the processor 100 matches the tag data tdt' stored in the memory device 300, data corruption has not occurred. When the tag data tdt does not match the tag data tdt', data corruption may have occurred. For example, the processor 100 may determine whether data corruption occurs according to the matching result and accordingly control memory access. The processor 100 and the memory controller 200 may enhance memory security by performing a tag operation.

Figure 8:
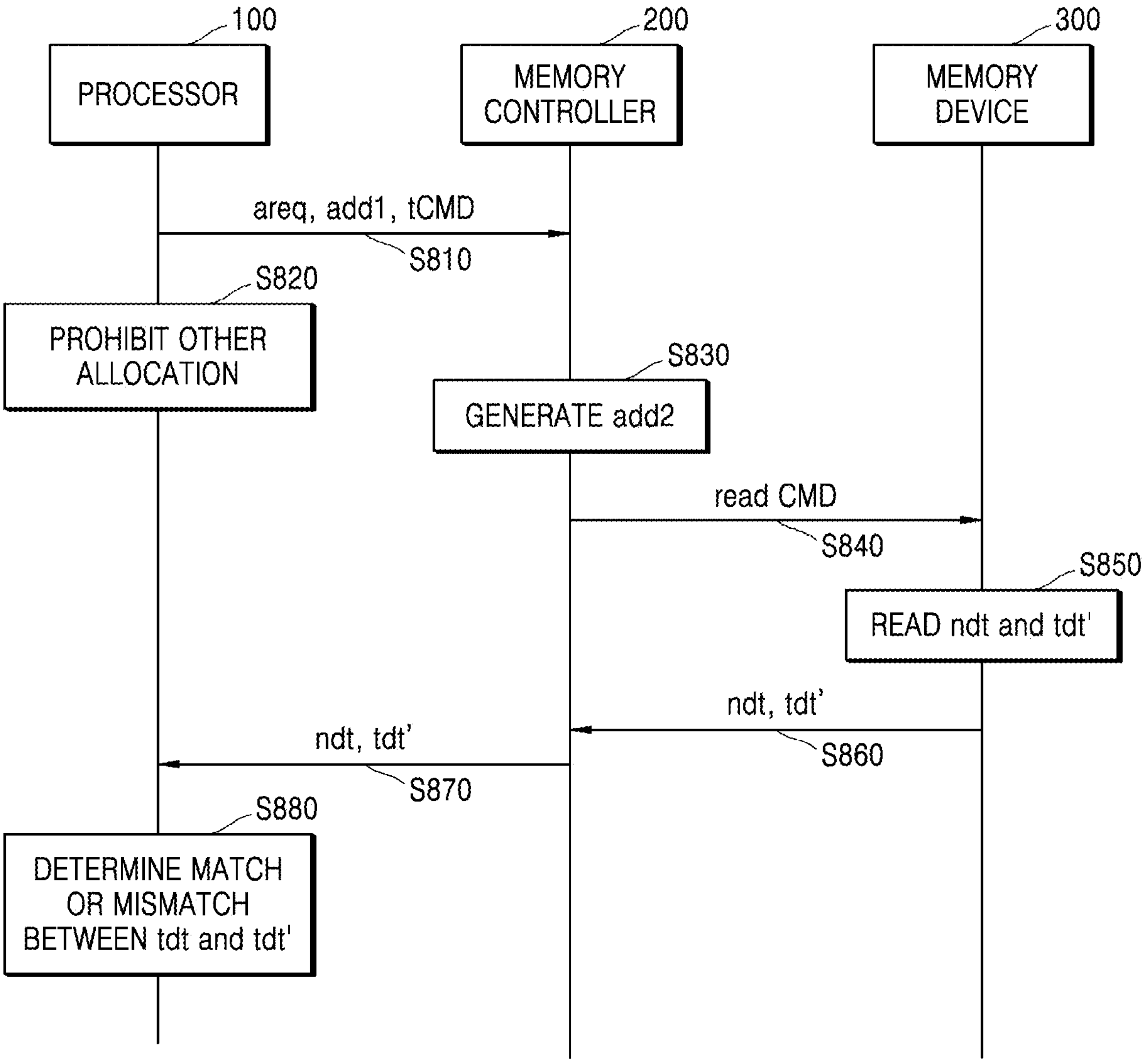
FIG. 8 is a diagram illustrating a read operation according to an embodiment.

FIG. 8 is a diagram illustrating a read operation according to an embodiment. FIG. 8 illustrates a method of performing a read operation during a tag operation. Redundant descriptions given with reference to FIG. 7 above are omitted.

To perform a read operation, the processor 100 may transmit the access request areq and the first address add1 to the memory controller 200. The processor 100 may also transmit the tag command tCMD to the memory controller 200 in operation S810 to perform a tag operation. During the tag operation, the processor 100 may transmit the access request areq corresponding to a read operation.

The processor 100 may prohibit designation of a tag region as a memory region, on which a memory operation on other normal data and other tag data is to be performed, in operation S820. Although it is illustrated in FIG. 8 that operation S830 follows operation S820, embodiments are not limited thereto. For example, operation S820 may follow operation S830 or operations S820 and S830 may be simultaneously performed.

The memory controller 200 may receive the access request areq, the first address add1, and the tag command tCMD from the processor 100. Because the memory controller 200 receives the tag command tCMD, the memory controller 200 may perform a tag operation. The memory controller 200 may generate the second address add2 based on the first address add1 in operation S830.

The memory controller 200 may generate a read command "read CMD" for reading the normal data ndt and the tag data tdt according to the access request areq in operation S840. The memory controller 200 may control the memory device 300 to read the normal data ndt from a data region based on the first address add1 and read the tag data tdt from the tag region based on the second address add2.

The memory device 300 may read the normal data ndt and the tag data tdt' in operation S850. The memory device 300 may read the normal data ndt from the data region corresponding to the first address add1. The memory device 300 may read the tag data tdt' from the tag region corresponding to the second address add2.

The memory device 300 may transmit the normal data ndt and the tag data tdt' to the memory controller 200 in operation S860. The memory controller 200 may transmit the normal data ndt and the tag data tdt' to the processor 100 in operation S870.

The processor 100 may determine whether the tag data tdt matches the tag data tdt' in operation S880. The processor 100 may determine whether the tag data tdt is the same as the tag data tdt'. For example, the processor may compare the tag data tdt with the tag data tdt'. The processor 100 may check data corruption based on whether the tag data tdt' read from the memory device 300 matches the tag data tdt intended by the processor 100. For example, the processor 100 may determine that a data corruption has occurred when the tag data tdt' does not match the tag data tdt.

Figure 9:
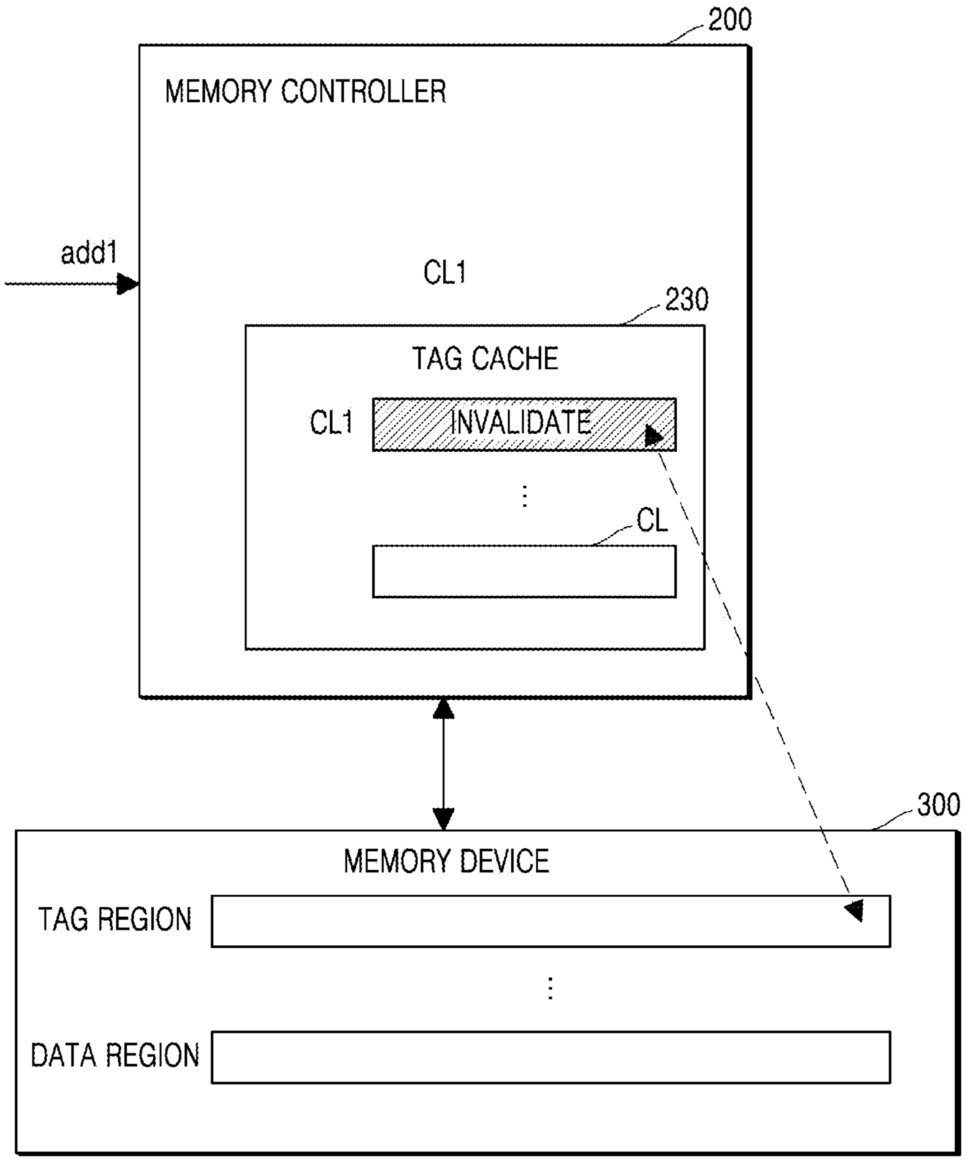
FIG. 9 is a diagram illustrating a tag cache according to an embodiment.

FIG. 9 is a diagram illustrating a tag cache according to an embodiment. The memory controller 200 and the memory device 300 in FIG. 9 respectively correspond to the memory controller 200 and the memory device 300 in FIG. 6A, and thus, redundant descriptions thereof are omitted.

Referring to FIG. 9, the memory controller 200 includes a tag cache 230. Although not shown in FIG. 9, the memory controller 200 may include a tag operation determinator (e.g., the tag operation determinator 210 in FIG. 6A) and an operation controller (e.g., the operation controller 220 in FIG. 6A) and may further include other components as needed.

The tag cache 230 may store at least part of data stored in the memory device 300. The tag cache 230 may include at least one cache line CL. For example, a first cache line CL1 may store at least part of data stored in a tag region of the memory device 300. The first cache line CL1 may be a cache line CL corresponding to the tag region.

The tag cache 230 may perform a cache operation on tag data. For example, the first cache line CL1 may store at least part of tag data stored in the tag region of the memory device 300. The first cache line CL1 may read tag data stored therein. For example, the tag cache 230 may include volatile memory (e.g., SRAM) but is not limited thereto.

During a normal operation, the memory controller 200 may receive the first address add1 from a processor (e.g., the processor 100 in FIG. 1). During the normal operation, the processor may designate either a tag region or a data region as a memory region for normal data. It is assumed in FIG. 9 that the processor designates a tag region as a memory region for normal data in a normal operation.

In an embodiment, when the first address add1 indicates a tag region that is cached by the tag cache 230, the memory controller 200 invalidates a cache line CL corresponding to the first address add1 in the tag cache 230. For example, the first address add1 may indicate a tag region of the memory device 300. The tag cache 230 may cache the tag region of the memory device 300, and the first address add1 may correspond to the first cache line CL1.

When the first address add1 indicates a tag region in a normal operation, the memory controller 200 may perform a memory operation on a memory region corresponding to the first address add1 in the memory device 300. When the tag cache 230 performs a write back operation by performing a cache operation on the tag region in the normal operation, normal data stored in the tag region may become corrupt. To prevent normal data stored in the tag region from becoming corrupt in a normal operation, the memory controller 200 may invalidate the cache line CL corresponding to the first address add1. For example, the memory controller 200 may invalidate the first cache line CL1. For example, the operation controller may invalidate the first cache line CL1 by erasing data stored in the first cache line CL1. In another example, the operation controller may invalidate the first cache line CL1 by setting or clearing a flag in a register in the memory controller 200 that is associated with the first cache line CL1.

Figure 10:
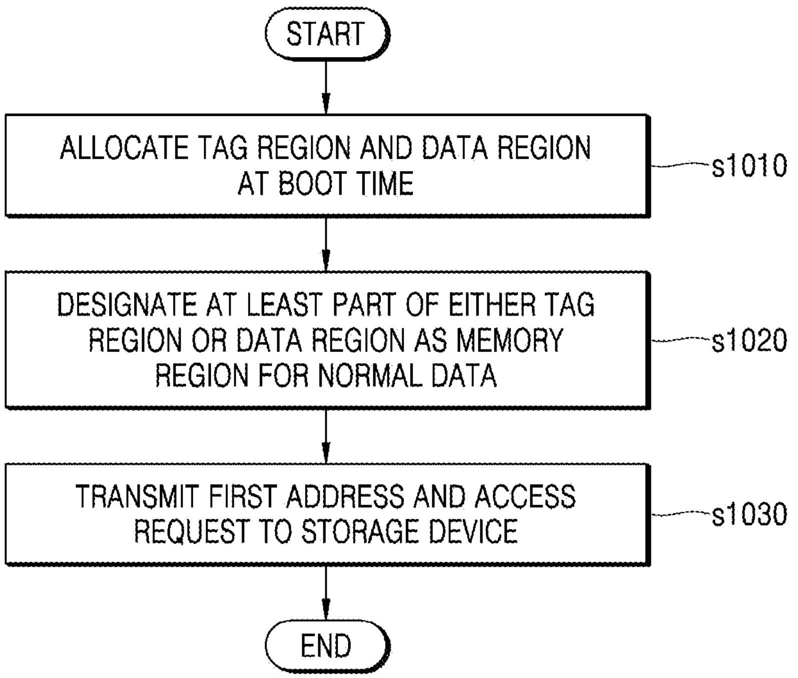
FIG. 10 is a flowchart of an operating method of a processor, according to an embodiment.

FIG. 10 is a flowchart of an operating method of a processor, according to an embodiment. In detail, FIG. 10 illustrates an operating method of the processor 100. Redundant descriptions give above are omitted below.

Referring to FIG. 10, the processor allocates a tag region and a data region at a boot time in operation S1010. For example, after power is restored to the processor, the processor may be booted during the boot time. The size and/or position of each of the tag region and the data region may be determined when the processor is booted. The tag region may correspond to a reserved region. In an embodiment, when the processor is booted, the position of each of the tag region and the data region is fixed in a memory device. The processor may execute an OS and allocate the tag region and the data region by fixing the position of each of the tag region and the data region in the memory device. For example, the processor may fix the first physical address to the start position of the data region and the second physical address to the start position of the tag region.

The processor may designate at least a part of either the tag region or the data region as a memory region on which a memory operation on normal data is to be performed in operation S1020. The processor may execute the OS to designate the memory region. The processor may issue an access request and designate the memory region on which a memory operation on the normal data is to be performed. In an embodiment, the processor may designate the memory region in either the tag region or the data region during a normal operation. The normal data may be stored in either the data region or the tag region.

During a tag operation, the processor may issue an access request and designate a memory region on which a memory operation on normal data and tag data is to be performed. In an embodiment, during the tag operation, the processor 100 may designate at least a part of the data region in the memory device as a memory region for the normal data and at least a part of the tag region in the memory device as a memory region for the tag data.

In an embodiment, during the tag operation, the processor 100 may prohibit allocation of the tag region for a memory region, on which a memory operation on other normal data and other tag data is to be performed. The processor 100 may execute the OS to prohibit the tag region indicated by the second address from being designated as a memory region for other normal data and tag data.

The processor 100 may transmit the first address and the access request to a storage device in operation S1030. In a normal operation, the processor 100 may generate the first address indicating a memory region designated for normal data. In the normal operation, the first address may indicate a memory region designated for normal data in either the tag region or the data region. The processor 100 may transmit the first address to the storage device. For example, in the normal operation, the processor 100 may transmit the first address and the access request to a memory controller of the storage device.

In an embodiment, the processor 100 generates a tag command in a tag operation. The tag command may be a command for performing a memory operation on tag data. In the tag operation, the processor 100 may generate the first address indicating a memory region designated for normal data. In the tag operation, the first address may indicate the memory region designated for the normal data in the data region. For example, in the tag operation, the processor 100 may transmit the first address, the tag command, and the access request to the memory controller.

Figure 11:
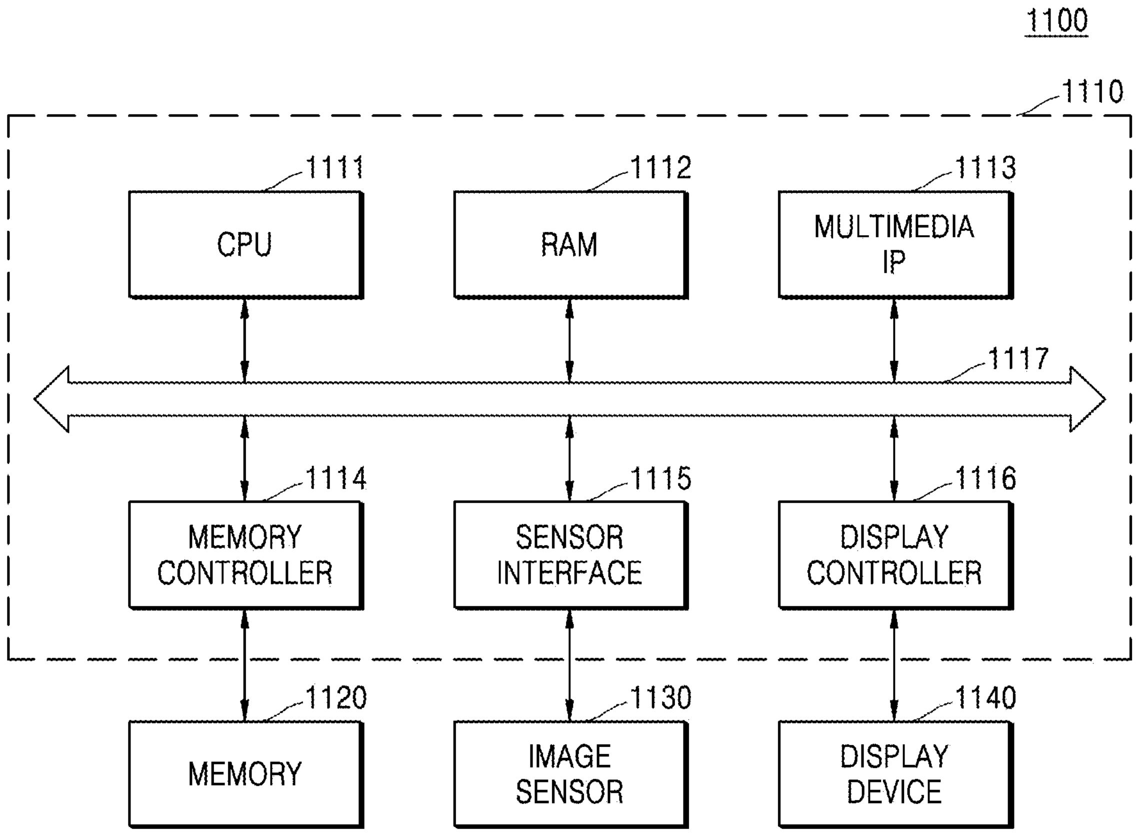
FIG. 11 is a block diagram of an electronic device according to an embodiment.

FIG. 11 is a block diagram of an electronic device according to an embodiment.

Referring to FIG. 11, an electronic device 1100 may include a computing system, such as a computer, a notebook computer, a server, a workstation, a portable communication terminal, a PDA, a PMP, a smartphone, or a wearable device.

The electronic device 1100 may include an SoC 1110, a display device 1140, a memory 1120, and an image sensor 1130.

The SoC 1110 may include a CPU 1111, RAM 1112, a multimedia intellectual property (IP) 1113, a memory controller 1114, a sensor interface 1115, and a display controller 1116. The SoC 1110 may further include other general components, such as a communication module and read-only memory (ROM). The SoC 1110 in FIG. 11 may be applied to the SoC 10 in FIG. 2.

Components of the SoC 1110, e.g., the CPU 1111, the RAM 1112, the multimedia IP 1113, the memory controller 1114, the sensor interface 1115, and the display controller 1116, may exchange data through a bus 1117. The AMBA protocol may be used as the standard protocol of the bus 1117. Besides the above, uNetwork, CoreConnect, or Open Core Protocol of OCP-IP may be used. In an embodiment, the bus 1117 may be formed as an NoC.

The CPU 1111 may generally control operations of the SoC 1110 and may correspond to the processor described above. The CPU 1111 may correspond to the processor (e.g., the processor 100 in FIG. 1) described with reference to FIGS. 1 to 10. The CPU 1111 may execute an OS and applications. The CPU 1111 may perform a normal operation and a tag operation. The normal operation may refer to a memory operation on normal data. The tag operation may include a memory operation on normal data and a memory operation on tag data.

The CPU 1111 may execute an OS and designate a memory region for normal data in a normal operation. The CPU 1111 may designate either a tag region or a data region as a memory region for normal data in a normal operation. The normal data may be stored in the data region or the tag region. In an embodiment, the CPU 1111 does not designate the tag region as a dedicated space for storing tag data but dynamically stores tag data and normal data in the tag region, thereby efficiently securing memory capacity.

In a tag operation, the CPU 1111 may execute an OS and designate a memory region. The CPU 1111 may designate at least a part of a data region as a memory region for normal data and at least a part of a tag region as a memory region for tag data in the memory device in a normal operation. In a tag operation, normal data may be written to or read from a data region and tag data may be written to or read from a tag region.

The RAM 1112 may include volatile memory, such as DRAM or SRAM. The RAM 1112 may include resistive-type memory, such as PRAM, MRAM, ReRAM, or FRAM. The RAM 1112 may temporarily store programs, data, and/or instructions.

The multimedia IP 1113 may perform image processing on image data, such as a still image or a moving image. For example, the multimedia IP 1113 may include at least one selected from the group consisting of an image signal processor (ISP), a GPU, a video processing unit (VPU), a display processing unit (DPU), and a neural network processing unit (NPU).

The ISP may change the format of received image data or correct the image quality of image data. For example, the ISP may receive RGB image data as input data and convert the RGB image data into YUV image data. For example, the ISP may perform image processing, such as adjusting the gamma value or luminance of received image data, expanding the dynamic range (DR) of the received image data, or removing noise from the received image data, thereby correcting the image quality of image data.

The GPU may compute and generate two-dimensional (2D) or three-dimensional (3D) graphics. The GPU may be specialized in processing graphics data and may process graphics data in parallel. Furthermore, the GPU may be used to perform complex operations, such as geometric calculation and scalar and vector floating-point calculations. The GPU may execute various instructions encoded using an application programming interface (API), such as OpenCL, OpenGL, or WebGL.

The VPU may correct the image quality of a received video or perform recording and playback of images, such as camcoding and playback of a video.

The DPU may perform image processing to display received image data on the display device 1140. For example, the DPU may change the format of received image data into a format suitable for a display or correct image data based on a gamma value corresponding to the display.

The NPU may perform image processing on received image data based on a trained neural network or may derive multiple features from image data and recognize an object, a background, etc. included in the image data, based on the features. The NPU may be specialized in neural network operations and may process image data in parallel.

The memory controller 1114 may interface with data or a command between the SoC 1110 and the memory 1120. The memory controller 1114 may transmit an access request from the bus 1117 to the memory 1120. The memory controller 1114 may generally control operations of the memory 1120 and may correspond to the memory controller of the embodiments described above. The memory controller 1114 may correspond to the memory controller (e.g., the memory controller 200 in FIG. 1) described above with reference to FIGS. 1 to 10.

The memory controller 1114 may control a memory device based on request signals received from the CPU 1111. The memory controller 1114 may perform a normal operation and a tag operation on the memory 1120. For example, when receiving a tag command from the CPU 1111, the memory controller 1114 may perform a tag operation.

The memory 1120 may correspond to a memory device according to the embodiments described above. The memory 1120 may correspond to the memory device (e.g., the memory device 300 in FIG. 2) described above with reference to FIGS. 1 to 10. The memory 1120 may include a tag region and a data region. The tag region may refer to memory regions in which tag data is stored in the memory 1120. The data region may refer to memory regions in which normal data is stored in the memory 1120. In a normal operation, normal data may be stored in the tag region.

The memory 1120 may include volatile memory, such as DRAM, SRAM, or SDRAM, or non-volatile memory, such as PRAM, MRAM, ReRAM, FeRAM, or NAND flash memory. The memory 1120 may include a memory card (e.g., a multimedia card (MMC), an embedded MMC (eMMC), a secure digital (SD) card, or a micro SD card). The sensor interface 1115 may interface with data or a command between the SoC 1110 and sensors. Although it is illustrated in FIG. 11 that the sensor interface 1115 interfaces with the image sensor 1130, embodiments are not limited thereto. According to embodiments, the sensor interface 1115 may interface with various kinds of sensors. For example, image data received from the image sensor 1130 may undergo image processing in at least one processing circuit of the multimedia IP 1113 and also undergo image processing of an application executed by the CPU 1111.

The display controller 1116 may interface with data (e.g., image data) output to the display device 1140. The display device 1140 may output data of an image or a video through a display, such as a liquid crystal display (LCD) or an active matrix organic light-emitting diode (AMOLED) display.

While the inventive concept has been particularly shown and described with reference to embodiments thereof, it will be understood that various changes in form and details may be made therein without departing from the spirit and scope of the following claims.

What is claimed is:

1. A system-on-chip comprising:

a memory controller configured to control a memory device including a tag region storing tag data and a data region storing normal data; and a processor configured to control a memory operation of the memory controller on the memory device, wherein the processor is further configured to fix a start position of the tag region and a start position of the data region in the memory device, and transmit an access request and a first address indicating a memory region of the memory device to the memory controller, wherein the memory operation on the normal data is to be performed on the memory region in one of the tag region and the data region, wherein the memory controller is further configured to perform the memory operation on the normal data based on the first address in response to the access request, and wherein, in response to the memory controller not receiving a tag command, the memory controller is further configured to:

determine to perform a normal operation on the normal data; and perform the memory operation on the normal data based on the first address.

2. The system-on-chip of claim 1, wherein the processor is further configured to transmit, to the memory controller, the first address indicating a region for performing the memory operation on the normal data in the data region and a tag command for performing a memory operation on the tag data corresponding to the normal data, and wherein the memory controller is further configured to perform a memory operation on the normal data on the data region based on the first address and perform a memory operation on the tag data on the tag region based on the first address.

3. The system-on-chip of claim 2, wherein, when the memory controller receives the first address and the tag command, the memory controller is further configured to generate a second address indicating a location of at least a part of the tag region, on which the memory operation on the tag data is to be performed, based on the first address and perform the memory operation on the tag data based on the second address.

4. The system-on-chip of claim 3, wherein the memory controller is further configured to generate the second address based on the first address, the start position of the tag region, and the start position of the data region.

5. The system-on-chip of claim 4, wherein, when the access request corresponds to a read request, the memory controller is further configured to:

read the normal data from the data region corresponding to the first address;

read the tag data from the tag region corresponding to the second address; and transmit the normal data and the tag data to the processor.

6. The system-on-chip of claim 3, wherein, when the access request corresponds to a write request, the memory controller is further configured to:

receive the normal data and the tag data corresponding to the normal data from the processor;

write the normal data to the data region corresponding to the first address; and write the tag data to the tag region corresponding to the second address.

7. The system-on-chip of claim 6, wherein the memory controller is further configured to:

read the tag data from the tag region after writing the tag data to the tag region corresponding to the second address;

determine whether the tag data received from the processor matches the tag data read from the tag region corresponding to the second address to calculate a matching result; and transmit the matching result to the processor.

8. The system-on-chip of claim 1, wherein the start position of the data region and the start position of the tag region are fixed in the memory device when the system-on-chip is booted.

9. The system-on-chip of claim 1, wherein the memory controller includes a tag cache storing tag data stored in at least a part of the tag region and the memory controller is further configured to invalidate a cache line of the tag cache corresponding to the first address based on the first address.

10. The system-on-chip of claim 9, wherein, when the processor transmits, to the memory controller, the first address indicating the tag region cached by the tag cache in the memory operation on the normal data, the memory controller is further configured to invalidate the cache line corresponding to the first address in the tag cache.

11. A memory controller for controlling a memory device, the memory controller comprising:

a logic circuit configured to receive, from a processor, a tag command for performing a tag operation on normal data and determine whether to perform one of the tag operation and a normal operation on the normal data based on the tag command; and an operation controller configured to receive, from the processor, a first address indicating a region of the memory device on which a memory operation on the normal data is to be performed and perform the memory operation on the normal data in a memory region of the memory device corresponding to the first address in a tag region and a data region of the memory device according to a result of the determination, wherein, in response to the tag operation on the normal data being determined to be performed and the first address indicating at least a part of the tag region, the operation controller is further configured to ignore the determination to perform the tag operation on the normal data.

12. The memory controller of claim 11, wherein the logic circuit is further configured to determine to perform the tag operation on the normal data when receiving the tag command and generate a second address based on the first address, and the second address indicates a memory region of the memory device on which the memory operation on tag data corresponding to the normal data is to be performed.

13. The memory controller of claim 12, wherein the operation controller is further configured to perform the tag operation on the normal data by performing the memory operation on the normal data in the data region based on the first address and performing the memory operation on the tag data in the tag region based on the second address.

14. The memory controller of claim 13, wherein, when a write operation is performed on the normal data, the operation controller is further configured to write the normal data to the data region corresponding to the first address, write the tag data to the tag region corresponding to the second address, read the tag data from the tag region, determine whether the tag data read from the tag region matches the tag data received from the processor to calculate a matching result, and transmit the matching result to the processor.

15. The memory controller of claim 11, further comprising a tag cache storing at least part of tag data stored in the tag region of the memory device.

16. The memory controller of claim 15, wherein, when the memory operation on the normal data is performed on the tag region cached by the tag cache based on the first address, the operation controller is further configured to invalidate a cache line of the tag cache corresponding to the first address in the tag cache.

17. An operating method of a processor communicating with a storage device, the operating method comprising:

allocating a tag region storing tag data and a data region storing normal data in the storage device when the processor is booted;

designating at least a part of one of the tag region and the data region as a memory region on which a memory operation on the normal data is to be performed; and transmitting a first address and an access request for the normal data to the storage device, the first address indicating the memory region on which the memory operation on the normal data is to be performed, wherein the designating the memory region comprises:

designating at least a part of the data region as the memory region on which the memory operation on the normal data is to be performed;

designating at least a part of the tag region as the memory region on which a memory operation on the tag data corresponding to the normal data is to be performed; and prohibiting the memory region, on which the memory operation on the tag data is to be performed, from being designated as a memory region, on which a memory operation on other normal data and other tag data is to be performed.

* * * * *